Dec. 8, 1942.    E. E. LINDSEY    2,304,579
METHOD AND MEANS FOR MAKING REFRIGERATED COMESTIBLES
Filed Dec. 6, 1938    2 Sheets-Sheet 1
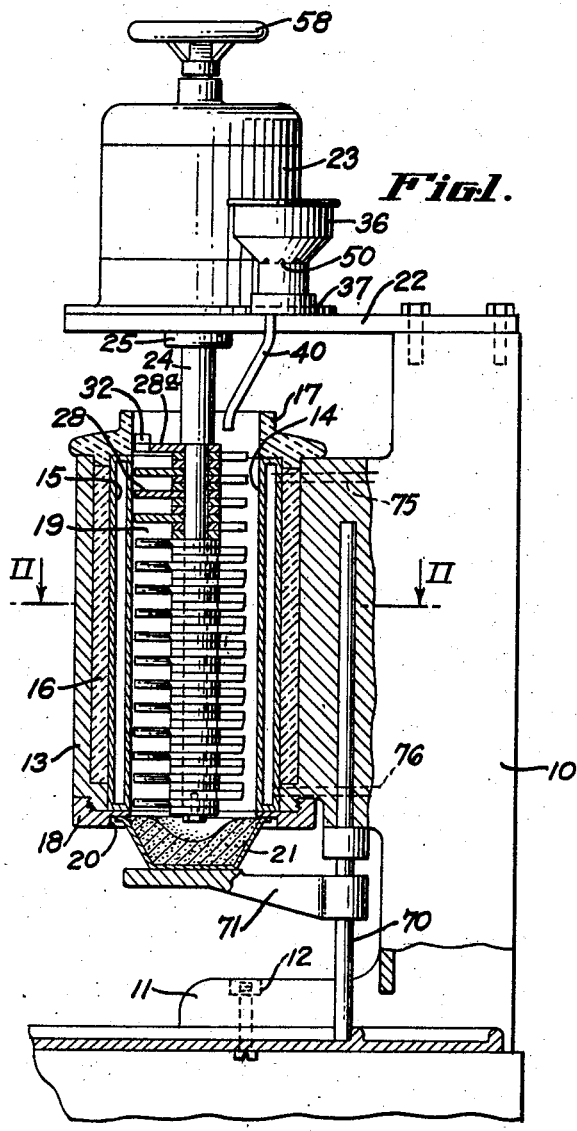
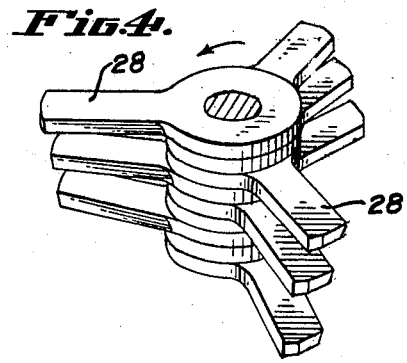
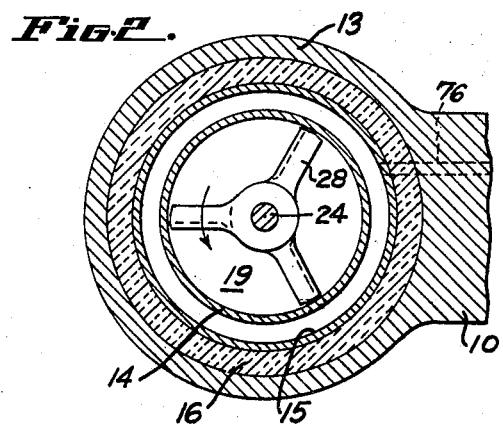
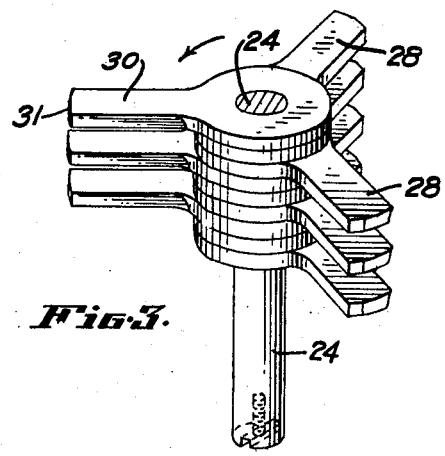
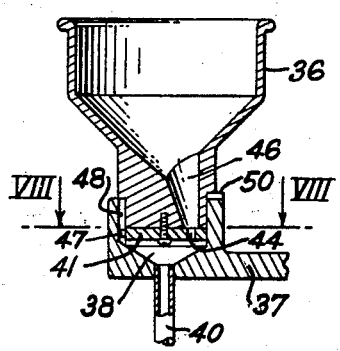
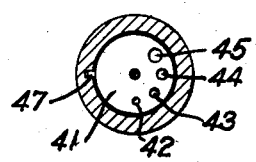
INVENTOR.
ERNEST E. LINDSEY.
BY Henry Gifford Hardy
ATTORNEY

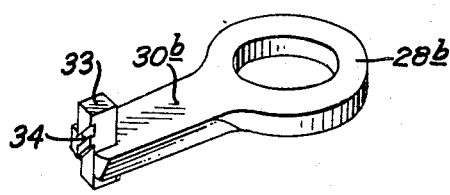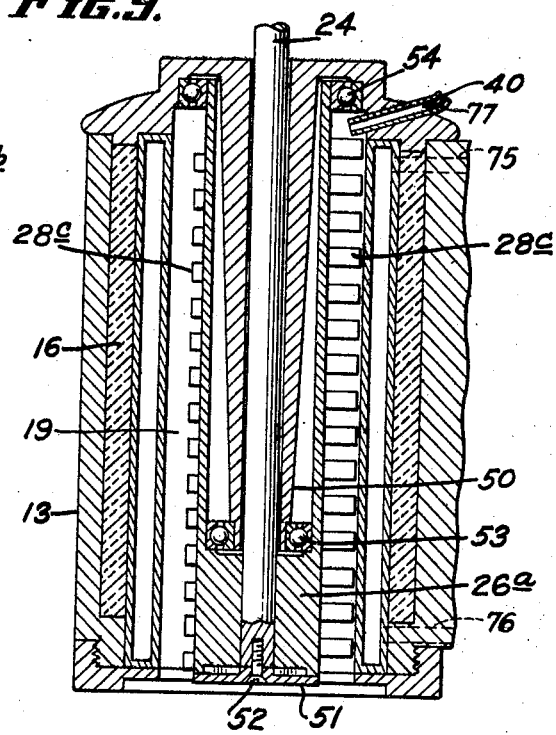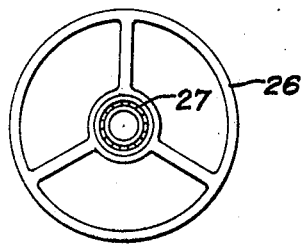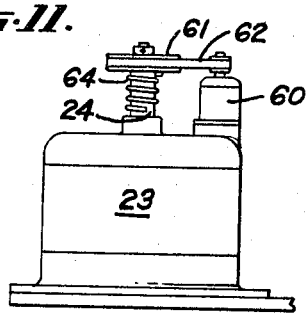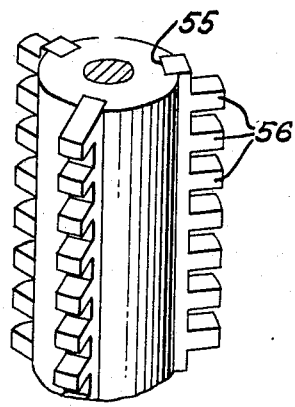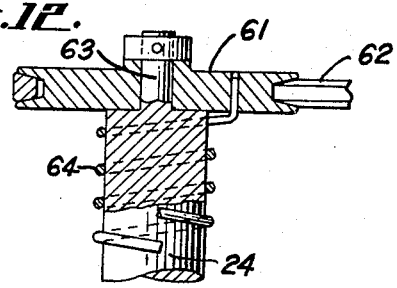

Patented Dec. 8, 1942

2,304,579

UNITED STATES PATENT OFFICE 2,304,579

METHOD AND MEANS FOR MAKING REFRIGERATED COMESTIBLES

Ernest E. Lindsey, Los Angeles, Calif., assignor to Insta-Freeze Corporation, a corporation of California Application December 6, 1938, Serial No. 244,167

14 Claims. (Cl. 62—114)

This invention relates to devices for making refrigerated comestibles and particularly with relation to frozen and chilled confections and the like which, so far as the frozen products are concerned, are prepared by instantaneous freezing and without the formation of any of the usual large ice crystals. More particularly the present invention relates to not only the device for producing this new type of frozen or chilled comestibles but also the method of preparing the products in condition for immediate consumption as well as for storage purposes.

It is among the objects of the present invention to provide a device for the making of frozen and chilled comestibles including frozen and chilled confections of various kinds whereby the material is delivered to a refrigerated chamber and in a very few seconds thereafter is delivered from the chamber in finished form.

Also among the objects is the provision of a device which has a large range of operations and which can accommodate not only individual portions but also the continuous production of the products for which it is well adapted. Within the range of the device the operation may include individual portions of different flavors which can be run separately and successively without stopping the operation of the device for a complete cleaning.

One of the particular advantages of the present device is that the operation provides a very remarkable quantity of increase or overrun, as it is known in the trade, without in any way or manner injuring the quality of the product or its nutrient value.

It is also among the objects of this invention to provide a method and means for producing a frozen or chilled product which brings out or points up the flavor of the materials used.

The invention further contemplates such other objects as will appear from the description of the present invention as it proceeds.

In attaining the foregoing objects together with such further benefits, advantages and capabilities as may hereinafter appear and as are inherently possessed thereby, there is used by way of example only, the construction shown in preferred form in the accompanying drawings wherein similar parts are designated by the same reference characters in the several views.

Referring now to the drawings:

Figure 1 is a view in side elevation partly in section.

Figure 2 is a horizontal fragmentary section taken on the line II—II of Figure 1.

Figure 3 is a fragmentary enlarged view in perspective of the rotor.

Figure 4 is a fragmentary enlarged view of the rotor in perspective showing another setting.

Figure 5 is an enlarged view of a blade member.

Figure 6 is a plan view of the spider.

Figure 7 is an enlarged sectional view of the feed cup assembly.

Figure 8 is a horizontal section taken on the line VIII—VIII of Figure 7.

Figure 9 is a vertical section showing another form of rotor and mounting.

Figure 10 is a perspective view showing another form of rotor.

Figure 11 is a side elevational view of the free running clutch assembly.

Figure 12 is a detail of the free running clutch assembly.

Referring more particularly to the drawings, there is shown in Figure 1 a complete assembly of the device itself. Structurally the device is built around a frame or housing 10 which is preferably vertical and provided with a base portion 11 which balances and holds the whole device in upright position. If necessary the base portion may be provided with suitable threaded bosses 12 for securing the base portion 11 onto a stand or a counter or any other convenient location.

The housing 10 has a cylindrical portion 13 which projects therefrom and which is preferably made integral with it. Concentric with the cylindrical member 13 and contained within it is a double walled inner cylindrical member having walls 14 and 15. The inner surface of the wall 14 forms the freezing surface or chilling surface of the refrigerating chamber 19. A space is provided between the wall 14 and the wall 15 and sealed off at the top and bottom for accommodating the freezing mixture and forming a brine channel which may be connected to the circulatory system of any well-known refrigerating device, the means and method not being shown as they do not form a part of this invention. This invention requires and contemplates a surface such as 14 which can be refrigerated for freezing or chilling the materials put through the device and hence any means of bringing the surface to the temperatures desired or required is contemplated. Thus the wall 14 may be surrounded by coils through which the freezing liquid of any well-known refrigerator system may be circulated or any other equivalent means used. Lead-ins 15 and 16 indicate connections for the circulation of a liquid refrigerant. Between the wall 15 and the cylindrical member 13 is placed suitable insulating material 16 for directing the temperatures used always in the direction of the freezing or chilling chamber. The assembly is held in airtight, non-communicating position by cap members 17 and 18, each of which are bored in their central portions to the same diameter as the freezing or chilling surface 14, so as to be uniform therewith. The lower cap member 18 may be recessed as at 20 to accommodate the lip or rim of a container 21.

Adjacent the upper portion of the frame or housing 10 is a bracket 22 suitably secured thereto for supporting a motor 23. There are suitable connections and switches, which are not shown, to control the operation of this motor. The speed of the motor 23 may of course be controlled with any of the several well-known means.

The motor is arranged for driving shaft 24 which passes directly through on the longitudinal axis of the freezing or chilling chamber coaxially with the surface 14 and extends to the lowermost portion of the said freezing or chilling chamber or cylinder. In addition to the motor bearings the bracket 22 is equipped with suitable bearings 25 for the shaft 24. Since the motor 23 is substantially a long shafted motor the shaft 24 is held in perfect alignment during rotation. If there is any need to improve the alignment to prevent possible chattering, a spider 26 provided with a suitable frictionless bearing 27 (see Fig. 6) may be placed in the outlet end of the freezing or chilling chamber 19.

Along a length of the shaft 24 which corresponds substantially with the portion thereof within the freezing or chilling chamber 19, there are a plurality of blades or key-like members 28 which are clearly shown in Fig. 3. These blades or key-like members 28 have a shank 30 which terminates at its outer extremity 31 in a segment of the curve which corresponds substantially to the curvature of the surface 14, although the key-like portion may be cut back in whole or in part to provide whatever additional clearance may be needed. These key-like members or blades 28 are stacked vertically and are preferably arranged on the shaft 24 in trefoils successively 120° apart. Obviously any other form of arrangement accomplishing the desired result is contemplated. When so arranged these blades will form or define a spiral or screwlike rotor assembly generally designated 26. If the successive blades 28 were formed in one piece without interstices they would form a short pitch screw thread and so when rotating, as disclosed herein, they would act, among other things, as a conveyor screw for carrying the material from top to bottom.

The blade members 28 may be arranged in vertical rows substantially as shown in Fig. 3 or they may be arranged with a longitudinal spiral twist such as is shown in Fig. 4. In this latter form the attack of the individual blades for scraping, beating and throwing and the like, is successive and not all at the same time as when the blades are lined up vertically such as in Fig. 3 and for many operations this is the preferable form.

Each of the key-like blade members 28 has its entering edge or face beveled downwardly and rearwardly at a suitable angle—an angle of 7° being well adapted for most purposes—so that the material striking it will be deflected toward the lower portion of the chamber 19. Near the bottom of the rotor 26 the blades may be cut back at an increased angle to insure a more rapid delivery of the material. It is contemplated, however, that the pitch or the degree of cut back may be altered or the shape changed in order to accomplish special results which may be necessary or desirable. As a matter of general practice, however, all of the blade members 28 are identical except the first one at the top. This member 28a has a plate 32 which is set at an angle at the outer end of the shank 30. In operation this plate 32 not only directs the incoming material downward to start it on its course but also prevents the material from being splashed or splattered out of the chamber 19.

An alternative design of these key-like blade members 28b is shown in Fig. 5. In this instance the outer end of the shank 30b is provided with a vertical fin 33 which is fitted in such a manner so that the outer extremities remain in the same segment or arc as before described. These vertical fins 33 may have a plain scraping surface or they may be provided with angular grooves or cuts 34 made in the same direction as the beveling on the shank on the key portions. This grooving assists in directing the material scraped from the surface 14 to be moved downwardly for action by the subsequent rotor blades as the material passes through the device.

It will be easily seen that the rate of flow or the speed at which the material to be treated is fed into the chamber 19 of the device, will, in a measure, govern or control the temperature of the material delivered at the outlet end. To regulate and govern the speed of such flow or the speed at which the material is fed, a regulating device is provided. The feed cup or funnel 36 is shown in Fig. 1 and shown also in enlarged sectional detail in Fig. 7. This feed funnel 36 may be of any desired shape and may be made for holding a measured quantity of material to produce a given amount of end product. It may be placed in any suitable position on the device itself and is here shown as mounted by means of bracket 37 on to the motor support 22 which in turn is attached to the main frame 10. It is understood that any suitable manner and means of mounting may be used. The bracket member 37 is provided with a sump 38 which drains into a feed pipe 40. Covering the sump 38 within the bracket 37 is an orifice plate 41 shown in enlarged detail in Fig. 8. This orifice plate 41 is provided with a series of openings 42, 43, 44 and 45 which are of different sizes and calculated to regulate the amount of material passing into the feed pipe 40 at any one time. The funnel member 36 has a directed outlet 46 which is designed to register with one of the outlets in the orifice plate 41. The orifice plate may be provided with a pin or lug 47 which fits into a key way 48 of the bracket 37 and holds it against rotation. The mounting, however, of the funnel portion 36 is such as to permit rotation so that the outlet 46 may be brought into register with any one of the outlets in the orifice plate 41. As a visible indication of the location of the orifices, notches 50 are provided. This gives the operator a visual check and control as to the location of the outlet 46 with respect to the openings in the orifice plate. It will thus be seen that when in position, the simple turning of the cup or funnel member 36 will direct the flow of the material through a suitably sized opening to govern the flow and likewise acts as a valve to entirely cut off the flow if desired. Obviously the relation of the rotatable members may be reversed so that the cup or funnel member 36 may be held against rotation and the orifice plate 41 rotated in and out of register with the outlet 40. Further, any means of valving or controlling the amount of flow is contemplated herein.

Before discussing the operation of the device, it should be stated that there are many ways of making the rotor which has been designated as 26. For example, there is shown an alternative form in Fig. 9. In this form the motor shaft 24 extends through the chamber 19 and passes through a tapered member 50 which is stationary and attached to the cover portion 17. Outside of this tapered member 50 is the cylindrical rotor 26a which is secured to the motor shaft by means of plate 51 and screw 52. Within the cylindrical portion of the rotor and at the lower end of the tapered member 50 is a suitable frictionless bearing 53 which, in conjunction with the frictionless bearing 54 at the upper end of the rotor, provides additional bearing surface to prevent possible side thrust or chattering due to the long overhang. The blade members 28c may be made integral with the cylindrical rotor 26a or may be made in the form of combs to fit in key ways provided in the rotor body as described elsewhere herein.

As referred to above, the rotor 26 instead of being built up of individual key-like members 38 may be formed of a single piece of material or may be formed of a cylindrical body member such as 26a into which key ways 55 are cut for the accommodation of the blades in the form of a comb 56 such as is shown in Fig. 10. Obviously, as before described, the key ways may be made in the form of a longitudinal groove or a spiral longitudinal groove.

It is contemplated that any suitable means for disconnecting the shaft 24 from the rotor 26 may be used so that the rotor 26 can be removed from the chamber 19 for cleaning purposes, the particular means not being shown herein.

The clearance between the end 31 of the blade members 28, 28c and 56 and the surface 14 is very slight and it has been found that when the machine is left idle for a time between servings and while the refrigerating mechanism is still operating that the moisture condensing from the air or the natural tendency of ice crystals to form and grow, produces a tendency for the ends of the blades to accumulate such ice and freeze the rotor fast. In order to overcome this condition, which is one of practical operation, a hand wheel 58 may be attached to the upper portion of the motor shaft 24 so that the operator may manually free the rotor from the wall 14 or make certain that it is free before starting the motor.

As an alternative form of eliminating this condition and one which is not dependent on human alertness, a second and smaller motor 60 is provided which is capable of rotating the shaft 24 and the rotor 26 at a reduced rate of speed which in practice has been found to be about 100 R. P. M. If the rotor is kept moving at approximately this speed, the device will remain always ready for instant use regardless of the time between servings. In coupling up the second motor 60 to the first motor, an overrunning clutch is used, so that when the first motor 23 is in use and operating at its normal high speed, the second motor 60 continues to idle at its relatively low speed. A simple method for accomplishing this result is illustrated in Figures 11 and 12, but it is to be understood that any suitable means for accomplishing this result is intended. For example, instead of the hand wheel 58 being attached to the upper end of the shaft 24, there is provided a pulley 61 which runs freely on stub shaft 63 and which may be driven by a belt 62 running to the motor 60. Surrounding a portion of the shaft 24 is a coiled wire or spring 64, one end of which is firmly affixed in the pulley 61. Thus, if the motor 23 is not running and it is desired to operate the motor 60 to rotate the rotor at the low speed described, the motor 60 as it turns the pulley 61, tightens the tension on the spring 64, which causes it to firmly grip the shaft 24 and rotate it. If, however, the motor 23 is also turned on to operate the device, then the shaft 24 is turned at a much higher rate of speed and there is no opportunity for the tension to build up on the spring 64. Therefore the tension is released and the spring 64 no longer grips the shaft 24 which freely rotates within it. It is contemplated that this free running clutch may include a collar of material such as that used for brake linings to be interposed between the spring coil 64 and the shaft 24. Obviously a single motor having two different speeds, one for the idling rotation and another for the operating rotation may be substituted for the two motors 23 and 60.

*Operation*

In describing the operation it is assumed that the refrigerator mechanism has been turned on a sufficient length of time to bring the surface 14 of the freezing or chilling chamber 19 to the temperature required for treating the material. It is preferable to have a sufficient control means for the refrigerator mechanism and circulation so that the temperature of the chamber 19 can be kept reasonably constant. This makes for uniformity of the products.

When the machine is turned on, the motor 23 rotates rapidly. It is assumed here that the speed of the motor may be controlled within limits as different materials require slightly different treatment but speeds between 800 R. P. M. and 3000 R. P. M. have been successfully used. The motor 23 rotates the shaft 24 and the rotor 25. Thus, as the rotor operates within the chamber 19, there is provided a spiral screw which results from the short spiral arrangement of the individual successive blades which is doubled if the rows of blades are also spiraled. As has been stated before, the space between the ends of the blades and the surface 14 is sufficient to permit rotation of the rotor without being in contact with the chamber wall.

Commercial practice up to the present time indicates that a speed of about 2000 R. P. M. produces satisfactory results with most materials. When operating at such a speed, the material is received in the cup or funnel like member 36 either in measured quantity or continuously as the case may be and is fed through a suitable aperture plate 41 down the feed pipe 40 and into the top portion of the chamber 19. Here it immediately comes into contact with whirling rotor blades 28 and is subject to a general downward course. If the top blade is one such as described 28a and provided with the plate 32, then the material is given an additional downward impetus.

The material upon striking the plate 32 or the blades 28 is directed by centrifugal force against the refrigerated surface 14 where it is frozen or chilled as the case may be instantly upon contact due to the fact that it is broken up in finely divided form and atomized into a mist of very small particles. Almost immediately the next succeeding blade scrapes it off the surface 14, breaks it up and throws it against the refrigerated wall so that there is a continual scraping, beating, atomizing and throwing of the material against the refrigerated surface 14 until the material is entirely beaten and aerated into a rich creamy mass which is delivered at the outlet end in the bottom of the chamber and into the receptacle 21.

As nearly as can be described, the path which the material follows is very complicated although generally the material is subjected to three separate kinds of action as it takes its course through the chamber from the inlet end to the outlet end. The first action to which the material is subject is contact with the blades and with the plate 32. This produces a centrifugal throw of the material in finely divided or atomized condition against the refrigerated surface 14. This contact and throw is continued throughout the course by recurrent breaking up the material as it is scraped from the refrigerated surface and again directing it in finely divided form against the refrigerated surface. The second action is the scraping action wherein the frozen or chilled material is constantly being scraped and removed from the refrigerated surface 14 by the action of the outer portion of each blade and in the modified form by the action of the vertical fins 33. This action is continued until the material is delivered into the receptacle 21. The third action to which the material is subjected is with respect to the movement created by the propelling force or screw force caused by the arrangement of the blades themselves or the arrangement of the rows of blades or both. This moves the entire material spirally downward from inlet to outlet end and this movement is in addition to the effect of gravity.

The housing portion 18 may be provided with a rod 70 upon which is positioned an adjustable table portion 71 for holding and receiving container 21 at the outlet end of the chamber 18. Thus when the material is coming through it may be delivered directly into the receiving receptacle in individual portions complete and ready for immediate consumption.

By the time the material is delivered to the receiving container, it has been subjected primarily to the three actions which have been described above. In this manner the material has been chilled, whipped, aerated, frosted or frozen to the point where there is a measurable increase in the volume between the amount of material put in and the amount of material delivered into the container, all within a very short space of time. The material delivered is so much under the control of the operator that it may emerge as a chilled drink, a creamy milk shake or a rich creamy semi-solid or as a frozen material as desired. In each instance, in addition to the large overrun, the resulting product has a remarkable and different texture which seems to enhance and bring out the flavors of the materials treated. The treatment produces a product which, although having the complete flavor of the starting material, has a surprisingly new and different taste sensation.

Obviously from the above described explanation of the operation, it will be seen that the device is capable of continuous action and that the material can be continuously supplied at the inlet end and continuously delivered at the outlet end.

So complete is the action of the rotor member 26 within the chamber 19 that successive use of materials with widely different flavors is possible without any noticeable or objectionable mixing or carrying over of the flavor of the preceding operation. The scraping of the inside of the chamber 19 and the refrigerated surface 14 is so complete as to deliver substantially all of the material which has been put into the machine at any one time.

Periodic cleanings are of course, essential not only from the standpoint of properly handling comestibles but also to comply with the food and health laws and regulations of the various states. This, as has already been disclosed, is provided for in the present invention.

It should also be stated that the whipping, atomizing, beating and aerating accomplished by the rotor as well as the scraping are such that this device may be used in the production of other products not frosted or chilled, such as whipped cream, and in the making of mayonnaise as well as many other products. In this event all that is required is the turning off of the refrigerating unit.

It is also to be understood that it is within the contemplation of the present invention to have the chamber 19 closed both at the inlet end and at the outlet end. The reason for having the operation take place within a closed chamber is to provide for the well-known expedient of injecting or feeding the materials used under pressure. In Fig. 9 there is indicated a pressure line 77 for this purpose. In this manner the pressure for feed may be provided by cleansed air under pressure or by an inert gas under pressure. In this manner the amount of air for aeration may be regulated and controlled at the same time.

I claim:

1. In a device for producing frozen and chilled comestibles including in combination, a refrigerated chamber having a refrigerated wall, a material supply source, means for supplying material to be treated to said chamber, rotatable means within said chamber comprising outwardly extending fingers or blades for delivering said material in finely divided form to said refrigerated wall and removing it therefrom, said means likewise acting to whip, aerate and move the material through said chamber, and means for collecting the material delivered from said chamber.

2. In a device for producing frozen and chilled comestibles including in combination, a refrigeration chamber having a refrigerated wall, a material supply source, control means for supplying material to be treated to said chamber at a predetermined flow, rotating means within said chamber comprising a plurality of outwardly extending fingers or blades for delivering said material in finely divided form to said refrigerated wall and removing it therefrom, said rotating means likewise acting to whip, aerate and move the material through said chamber, and means for collecting the material delivered from said chamber.

3. In a device for producing frozen and chilled comestibles including in combination, a refrigeration chamber having a refrigerated wall, a material supply source, control means for supplying material to be treated to said chamber at a predetermined flow, rotating means including a plurality of radially extending blades within said chamber for delivering said material in finely divided form to said refrigerated wall and removing it therefrom, said rotating means likewise acting to whip, aerate and move the material through said chamber, and means for collecting the material delivered from said chamber.

4. In a device for producing frozen and chilled comestibles including in combination, a closed refrigerated chamber having a refrigerated wall, a supply source means, means for supplying material to be treated to said chamber under pressure by a gas in controlled amounts, rotatable means within said chamber comprising a plurality of fingers or blades for delivering said material in finely divided form to said refrigerated wall and removing it therefrom, said means likewise acting to whip, aerate and move the material through said chamber, and means for collecting the material delivered from said chamber.

5. In a device for producing frozen and chilled comestibles including in combination, a closed refrigerated chamber having a refrigerated wall, a material supply source, control means for supplying material to be treated to said chamber at a predetermined flow and under pressure by a gas in controlled amounts, rotating means including a plurality of radially extending blades within said chamber for delivering said material in finely divided form to said refrigerated wall and removing it therefrom, said rotating means likewise acting to whip, aerate and move the material through said chamber, and means for collecting the material delivered from said chamber.

6. Means for freezing or chilling a confection mixture comprising, a chamber provided with a surface adapted to be refrigerated, means for refrigerating said surface, and means for continuously and simultaneously breaking up into finely divided form and distributing said mixture on said surface and successively scraping it therefrom, breaking it up and redistributing it thereon to thoroughly beat and aerate said material.

7. Means for freezing or chilling a confection comprising, a chamber provided with an inlet and outlet and a surface adapted to be refrigerated, means for refrigerating said surface, a material supply source, means for feeding the said material to said chamber and rotating means for continuously, simultaneously and progressively breaking up into finely divided form and distributing said mixture on said surface, and successively scraping it therefrom, breaking it up and redistributing it thereon to thoroughly beat up and aerate the said material.

8. Means for freezing or chilling a liquid comprising, a chamber provided with an inlet and outlet and a surface adapted to be refrigerated, means for refrigerating said surface, means for feeding a liquid to said chamber at a predetermined rate of flow, means provided with a plurality of radially extending blades for continuously and simultaneously breaking up into finely divided form and distributing said liquid on said surface and successively scraping it therefrom, breaking it up and redistributing it thereon to thoroughly beat up and aerate the treated liquid, and means for receiving the treated material at the outlet of said chamber.

9. In a device for freezing or chilling a confection mixture the combination of, a refrigeration chamber having a wall adapted to be refrigerated and a rotatable member disposed coaxially within said chamber for finely dividing said mixture, throwing it against the refrigerated wall, scraping it therefrom, beating and aerating the same, said rotatable member being provided with a plurality of radially extending blades successively spaced to form a screw and grouped to form a longitudinal spiral.

10. In a device for freezing or chilling a confection mixture a combination of, a refrigerated cylinder and rotatable member disposed coaxially within said cylinder for finely dividing said mixture, throwing it against the refrigerated wall, scraping it therefrom, beating and aerating the same, said rotatable member being provided with a plurality of radially extending blades spaced from said cylinder wall only a sufficient amount to permit rotation of the rotatable member without contact with said wall.

11. The method of chilling or freezing a confection mixture which comprises the steps of delivering the mixture to a refrigerated chamber, breaking up the mixture into finely divided form and delivering it to a refrigerated surface continuously and simultaneously, scraping said material from the refrigerated surface, breaking it up and re-delivering it to the refrigerated surface numerous times as the material passes through the device so that the material is thoroughly whipped, beaten and aerated in addition and delivering the treated material in the form of a chilled or frozen confection.

12. The method of chilling or freezing a confection mixture which comprises the steps of delivering a mix to a refrigerated chamber, breaking up the mix into finely divided form while delivering it to the refrigerated surface, progressively and simultaneously scraping the material from the refrigerated surface of said chamber, breaking it up into finely divided form and redelivering it to the said refrigerated surface numerous times as the material passes through the refrigerated chamber once.

13. The method of chilling or freezing a confection mixture which comprises the steps of delivering a mix at one end of a refrigerated chamber, breaking up the mix into finely divided form while delivering it to the refrigerated surface of said chamber, progressively and simultaneously, scraping the material from the refrigerated surface of said chamber, breaking it up into finely divided form and redelivering it to the said refrigerated surface numerous times as the material passes through the refrigerated chamber once so that the material is thoroughly whipped, beaten and aerated in addition, and delivering the material at the opposite end of the refrigerated chamber in the form of a chilled, or frozen confection.

14. The method of preparing food products comprising the steps of delivering a mix to a chamber, breaking up the mix into finely divided form while delivering it to the surface of said chamber, progressively and simultaneously scraping the material from the surface of said chamber, breaking it up into finely divided form and redelivering it to the said surface numerous times as the material passes through the chamber once.

ERNEST E. LINDSEY.